Figure 1:
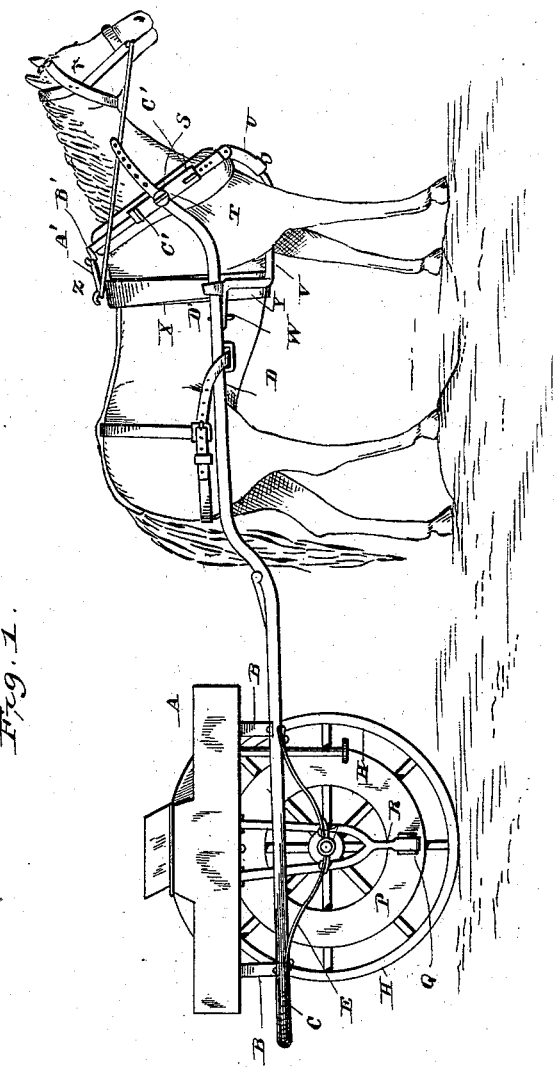

(No Model.) 2 Sheets—Sheet 1.

C. B. JAMES.
VEHICLE.

No. 270,076. Patented Jan. 2, 1883.

Witnesses.
Edwin L. Yerxee
J. J. McCarthy

Inventor.
Charles B. James.
C. M. Alexander.
Attorney (No Model.)
2 Sheets—Sheet 2.
C. B. JAMES.
VEHICLE.
No. 270,076.   Patented Jan. 2, 1883.
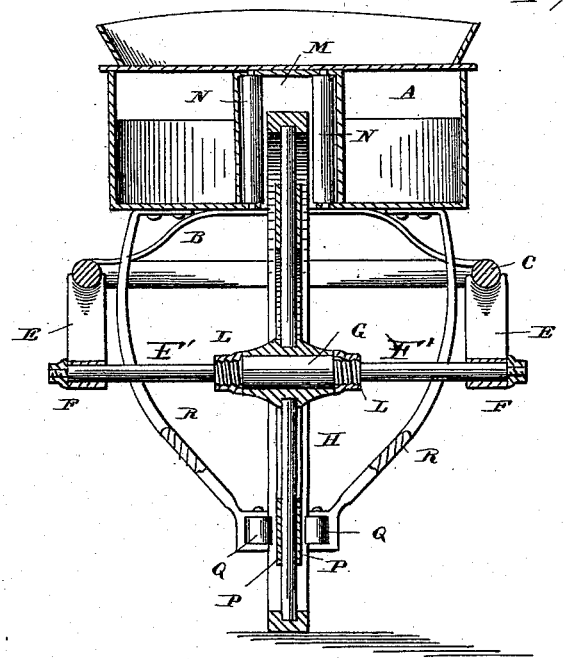
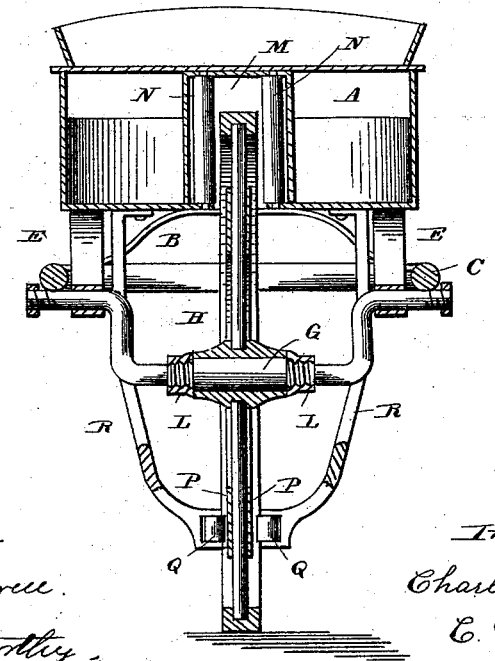
Witnesses.
Edwin L. Yewell.
J. J. McCarthy.
Inventor.
Charles B. James.
E. M. Alexander
Attorney.

UNITED STATES PATENT OFFICE.

CHARLES B. JAMES, OF ST. LOUIS, MISSOURI.

VEHICLE.

SPECIFICATION forming part of Letters Patent No. 270,076, dated January 2, 1883.

Application filed October 4, 1882. (No model.)

*To all whom it may concern:*

Be it known that I, CHARLES B. JAMES, of St. Louis, in the county of St. Louis, and in the State of Missouri, have invented certain new and useful Improvements in Buggies; and I do hereby declare that the following is a full, clear, and exact description thereof, reference being had to the accompanying drawings, and to the letters of reference marked thereon, making a part of this specification.

This invention relates to certain improvements in buggies or other vehicles and the harness to be employed therewith; and it consists in certain improved constructions and arrangements of parts, as will be more fully hereinafter set forth, and pointed out in the claims.

In the drawings, Figure 1 represents a side elevation of my improved vehicle, showing a horse hitched thereto. Fig. 2 represents a transverse vertical section of the vehicle, taken on the line of the axle, and Fig. 3 represents a similar view of a modification of the vehicle.

The letter A indicates the box or body of the vehicle, which is mounted on springs B, secured to a frame, C, the forward ends of which are extended upward, forming the shafts D.

To the sides of the frame are secured the springs E, which have attached to them, midway between their ends, axle-supports F. The axle F' is journaled at its respective ends in these supports, and has an enlarged central portion, G, upon which is mounted a wheel, H, upon which the vehicle travels, the wheel being held upon the axle, by means of screw-nuts I, in such manner that it may turn freely. The upper part of the wheel extends up into a housing, M, at the center of the box or buggy, and is arranged to run between rollers N in said housing, and the wheel is provided on opposite sides with broad flanges P, which run between rollers Q at the lower ends of the hangers R, secured to the bottom of the box. The said rollers are for the purpose of keeping the box in an upright position when the buggy is overweighted or overbalanced at either side.

The shafts, as before mentioned, extend upward through apertures in the studs S, secured to the hames, to which they are adjustably fastened by means of set-screws T.

At the lower or forward part of the hames is pivoted a bent flat tube, U, which passes down the breast of the animal, and has adjustably secured in its lower end one end of a bifurcated frame, V, which passes under the front legs of the animal and branches to each side, being secured to the shafts at their ends by means of the swiveled buttons W.

The letter X indicates a metallic saddle, which sets over the harness strap Y, and is provided with a hook, Z, by means of which it may be connected by a strap, A, to the hook B' at the rear of the hames. The hames are constructed of flat tubular side sections and adjustable end sections, which are confined at any desired position by means of set-screws C'. The lower ends of the saddle X are provided with hooks D', which are adapted to engage the shafts and distribute the weight of the vehicle and its contents.

In the modification shown in Fig. 3 of the drawings a bent axle is employed, the springs E, which support the body, being attached directly to said body and the axle.

Having thus fully described my invention, what I claim, and desire to secure by Letters Patent, is—

1. The combination, in a vehicle having the body provided with a housing and supporting-springs, and the skeleton frame having supporting-springs provided with journal-bearings, of the centrally-arranged wheel and its shaft, adapted to rotate in said journals, substantially as shown and described.

2. In combination with the box or body and the centrally-arranged wheel, the rollers in the housing and at the ends of the hangers, adapted to bear against the wheel, substantially as and for the purposes specified.

3. The combination, in a vehicle, of a frame provided with supporting-springs having axle-supports, with a centrally-located wheel provided with an axle having means for retaining it in proper position, said axle being journaled in the supports or bearings, substantially as shown and described.

4. In combination with the vehicle and its supporting-frame, forming the shafts thereof, and the centrally-mounted wheel, the adjustable hames, provided with studs through which the shafts pass, having set-screws for fastening the shafts, substantially as and for the purposes set forth.

5. In combination with the vehicle, constructed as described, the adjustable hames and adjustable bifurcated connection, adapted to extend between the animal's forward legs, and to be connected to the shafts, and the saddle provided with hooked ends to support the shafts, and connected to the hames and harness, substantially as and for the purposes specified.

In testimony whereof I affix my signature, in presence of two witnesses, this 11th day of September, 1882.

CHAS. B. JAMES.

Witnesses:
JOHN F. BRITTINGHAM,
J. J. MARTIN.